Aug. 2, 1955  C. A. ARNOLD  2,714,367

ANIMAL PEN STRUCTURE

Filed Sept. 12, 1952

INVENTOR.
CHARLIE A. ARNOLD
BY
McMorrow, Berman + Davidson
ATTORNEYS

United States Patent Office 2,714,367
Patented Aug. 2, 1955

2,714,367

ANIMAL PEN STRUCTURE

Charlie A. Arnold, Whitewater, Wis.

Application September 12, 1952, Serial No. 309,339

2 Claims. (Cl. 119—27)

This invention relates to animal pen structures, and more particularly to such structures especially useful for the confinement of hogs during the farrowing period.

An object of the present invention is to provide an animal pen structure which can be enlarged or reduced in size at will into that of the animal to be confined therein.

Another object of the present invention is to provide an animal pen structure which is readily assembled or disassembled.

A further object of the present invention is to provide an animal pen structure which is simple, and commercially feasible.

Other objects and advantages of the invention will become apparent from a consideration of the following description taken in conjunction with the accompanying drawings, wherein.

Figure 1:
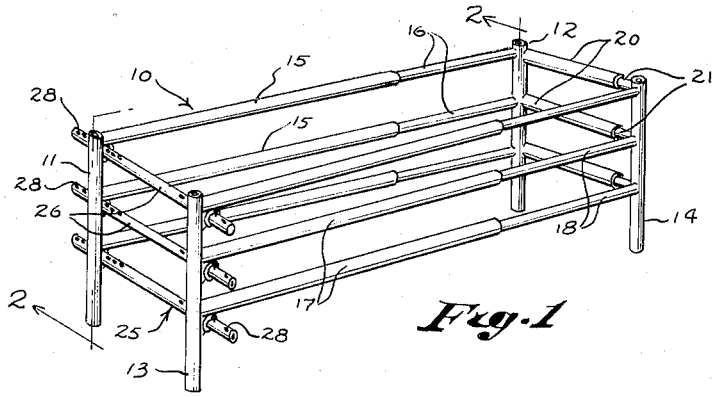
Figure 1 is a perspective view of an animal pen structure according to the present invention.
Figure 2:
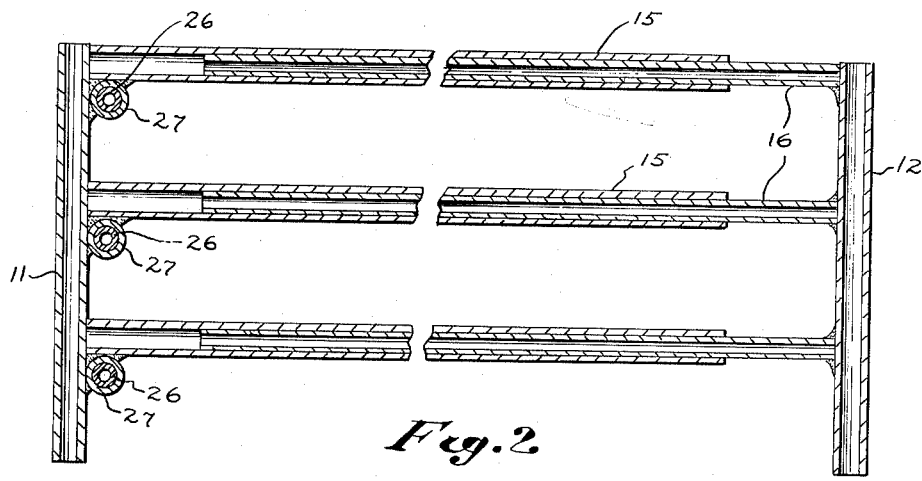
Figure 2 is an enlarged elevational sectional view taken along the line 2—2 of Figure 1.

Referring to the drawings where like reference numerals have been used throughout, the numeral 10 designates an animal pen structure according to the present invention, the pen comprising a first pair of posts 11 and 12 arranged in longitudinal spaced and aligned relation. At least two members arranged in end to end relation are positioned longitudinally of and between the posts 11 and 12, and are connected to the posts and to each other for longitudinal extensile and contractile movement. Specifically, the two members each have one end fixedly secured to the adjacent posts, the other ends of the members being slidably connected together. As shown in Figures 1 and 2, the two members extending between the posts 11 and 12 embody a plurality of or three hollow tubes 15 and a like number of hollow tubes 16 arranged in end to end superimposed spaced relation with respect to the tubes 15, one end of the tubes 15 being fixedly secured to the post 11 and of the tubes 16 being fixedly secured to the post 12, the other ends of the tubes 16 extending into and slidably supported in the complemental other ends of the tubes 15.

A second pair of posts 13 and 14 arranged in longitudinal aligned spaced relation are positioned in parallel spaced relation with respect to the posts 11 and 12. At least two other members arranged in end to end relation are positioned longitudinally of and between the second pair of posts 13 and 14 and are connected to the posts 13 and 14 and to each other for longitudinal extensile and contractile movement. Specifically, the two other members each have one end fixedly secured to the adjacent posts, the other ends of the members being slidably connected together. As shown in Figure 1, the two other members extending between the posts 13 and 14 embody a plurality of or three hollow tubes 17 and a like number of hollow tubes 18 arranged in an end to end superimposed spaced relation with respect to the tubes 17, one end of the tubes 17 being fixedly secured to the posts 13 and of the tubes 18 being fixedly secured to the posts 14, the other ends of tubes 18 extending into and slidably supported in the complemental other ends of the tubes 17.

At least two further members arranged in end to end relation are positioned transversely of and between adjacent posts of the first pair of posts 11 and 12 and the second pair of posts 13 and 14 and are connected to such adjacent posts and to each other for transverse extensile and contractile movement. Specifically, the two further members each have one end fixedly secured to the adjacent posts, the other ends of members being slidably connected together. As clearly shown in Figure 1, the two further members extending between the post 12 of the first pair of posts 11 and 12 and post 14 of the second pair of posts 13 and 14 embody a plurality of or three hollow tubes 20 and a like number of hollow tubes 21 arranged in end to end superimposed spaced relation with respect to each other, one end of the tubes 20 being fixedly secured to the post 12 and of the tubes 21 being fixedly secured to the post 14, the other ends of the tubes 21 extending into and slidably supported in the complemental other ends of the tubes 20.

Figure 3:
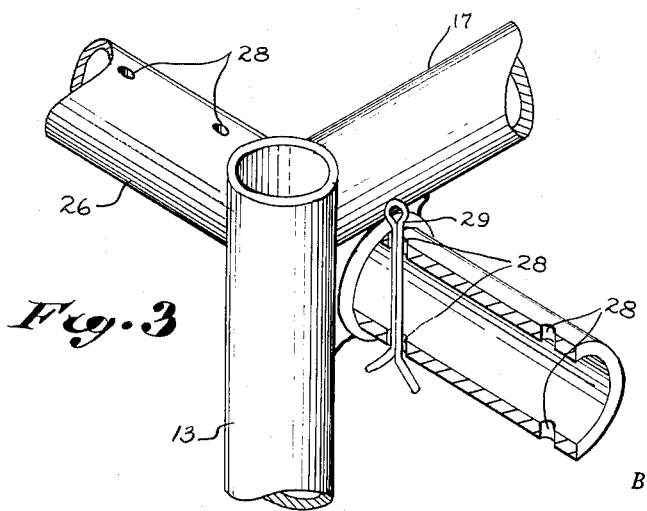
Figure 3 is an enlarged fragmentary view of the portion of a gate tube, with parts broken away and in section, and its connection with the adjacent post.

A gate 25 extends transversely of and between the other adjacent posts of the first pair of posts 11 and 12 and the second pair of posts 13 and 14 and is connected to such adjacent posts. As shown in Figures 1 and 2, the gate 25 comprises a plurality of spaced bar members or three hollow tubes 26 arranged in superimposed spaced relation, the tubes being slidably supported on the posts 11 and 13 as by complemental supporting elements or collars carried by the latter named posts. Since the collars are of identical structure, the collars carried by the post 13 are only shown, and such collars are designated by the numeral 27. Each of the tubes 26 is provided with a plurality of opposed pairs of openings 28 arranged in longitudinal spaced relation inwardly of each end thereof. The respective tubes 26 are each locked in position upon the collars 27 of the posts 11 and 13 by means of a securing element or cotter pin 29, Figure 3, extending through an opposed pair of openings 28 of the topmost tube 26 and engaging the outer end of the adjacent collar 27 carried by the post 13.

To enlarge the size of the thus described pen, the cotter pins 29 are removed from the opposed pairs of openings 28 in the respective tubes 26 and the hollow tubes withdrawn from the collars 27, whereupon the posts 13 and 14 and the tubes 17 and 18 carried thereby are moved away from the posts 11 and 12 and the tubes 15 and 16 carried thereby to the desired extent, then the posts 11 and 13 carrying the tubes 15 and 17 respectively are moved away from the posts 12 and 13 carrying the tubes 16 and 18 respectively to the desired extent, and finally the tubes 26 are reinserted in the collars 27 and locked in position on the posts 11 and 13 by insertion of the respective cotter pins 29 in the adjacent pairs of openings 28. To reduce the size of the thus described pen, the same procedure is followed as specifically described for the enlargement except that the movements are toward in place of away from the respective posts.

Having fully described the invention, what I claim as new and desire to secure by Letters Patent is:

1. An animal pen structure comprising a first pair of posts arranged in longitudinal aligned spaced relation, at least two members arranged in end to end relation positioned longitudinally of and between said posts and connected to said posts and to each other for longitudinal extensile and contractile movement, a second pair of posts arranged in longitudinal spaced relation with respect to each other positioned in parallel spaced relation with respect to said first pair of posts, at least two other members arranged in end to end relation positioned longitudinally of and between said second pair of posts and connected to the last mentioned posts and to each other for longitudinal extensile and contractile movement, at least two further members arranged in end to end relation positioned transversely of and between adjacent posts of said first and second named pairs of posts and connected to said adjacent posts and to each other for transverse extensile and contractile movement, a plurality of supporting elements arranged in spaced relation along each of the other adjacent posts of said first and second named pairs of posts, a gate extending transversely of and between the other adjacent posts of said first and second named pairs of posts, said gate including spaced bar members each having the end portions slidably supported in the adjacent supporting elements of said other adjacent posts of said first and second named pairs of posts, and means for locking the bar members in position.

2. An animal pen structure comprising a first pair of posts arranged in longitudinal aligned spaced relation, at least two members arranged in end to end relation positioned longitudinally of and between said posts and connected to said posts and to each other for longitudinal extensile and contractile movement, a second pair of posts arranged in longitudinal spaced relation with respect to each other positioned in parallel spaced relation with respect to said first pair of posts, at least two other members arranged in end to end relation positioned longitudinally of and between said second pair of posts and connected to the last mentioned posts and to each other for longitudinal extensile and contractile movement, at least two further members arranged in end to end relation positioned transversely of and between adjacent posts of said first and second named pairs of posts and connected to said adjacent posts and to each other for transverse extensile and contractile movement, a plurality of supporting elements arranged in spaced relation along each of the other adjacent posts of said first and second named pairs of posts, a gate extending transversely of and between the other adjacent posts of said first and second named pairs of posts, said gate including spaced bar members each having the end portions slidably supported in the adjacent supporting elements of said other adjacent posts of said first and second named pairs of posts, each of the end portions of each bar member being provided with a plurality of spaced opposed pairs of openings, and a securing element extending through a pair of opposed openings in each end portion of each bar member and engageable with the adjacent supporting element for locking the bar members in position.

References Cited in the file of this patent

UNITED STATES PATENTS

| | | |
|---|---|---|
| 642,561 | Phillips | Jan. 30, 1900 |
| 2,231,381 | Boehmcke | Feb. 11, 1941 |
| 2,491,577 | Olinger | Dec. 20, 1949 |
| 2,593,597 | Palmer | Apr. 22, 1952 |

FOREIGN PATENTS

| | | |
|---|---|---|
| 974,783 | France | Oct. 4, 1950 |